Nov. 15, 1927. 1,649,680
E. FRIEDRICHS
ELECTRIC LIGHTING OF AUTOMOBILE VEHICLES
Filed Feb. 6, 1920

Inventor
Ernst Friedrichs
By his Attorneys
Pennie Davis Marvin & Edmonds

Patented Nov. 15, 1927.

1,649,680

UNITED STATES PATENT OFFICE.

ERNST FRIEDRICHS, OF STUTTGART, GERMANY, ASSIGNOR TO THE FIRM OF ROBERT BOSCH AKTIENGESELLSCHAFT, AT STUTTGART.

ELECTRIC LIGHTING OF AUTOMOBILE VEHICLES.

Application filed February 6, 1920, Serial No. 356,792, and in Germany November 25, 1918.

This invention relates to electric lighting apparatus for vehicles driven by combustion motors in which a dynamo driven by the vehicle motor and a battery supply current individually at different times or both together. The invention also relates to electric lighting apparatus of this type, in which an electric motor operated by current from the battery starts the vehicle motor.

The passage of current between the dynamo and the battery in such arrangements is preferably indicated by a visible or audible signal instead of by a measuring instrument. It is desirable to have such a signal, which gives a noticeable indication of the position of the automatic charging switch between the dynamo and the battery, for the driver during a journey can give only very little attention to a measuring instrument.

A very noticeable indication of the position of the cut-off switch of the ignition is also desirable. Ordinarily, the driver, upon leaving the car, cuts off the ignition by means of a key in order to prevent the car from being started by unskilled persons. The rendering of a vehicle unusable upon leaving it is often legally prescribed. However, if the driver forgets to remove the key the safety device has failed in its purpose. Often he puts himself in danger of punishment. On the other hand, in vehicles with electric starters, the ignition must be ready for operation before the starting motor is switched in. Otherwise the started might vainly drive the combustion motor and might even injure itself or exhaust the battery before the driver becomes aware of the fact that he has forgotten to move the switch for the ignition to the driving position.

The purpose of the invention is to indicate by means of one single visible or audible electrically operated signal the position of the automatic charging switch between the dynamo and the battery, as well as the position of the ignition switch, without a special knob or push button being necessary for connecting the signal circuit to the one of the two switch devices whose position is to be shown at the time.

Figure 1:
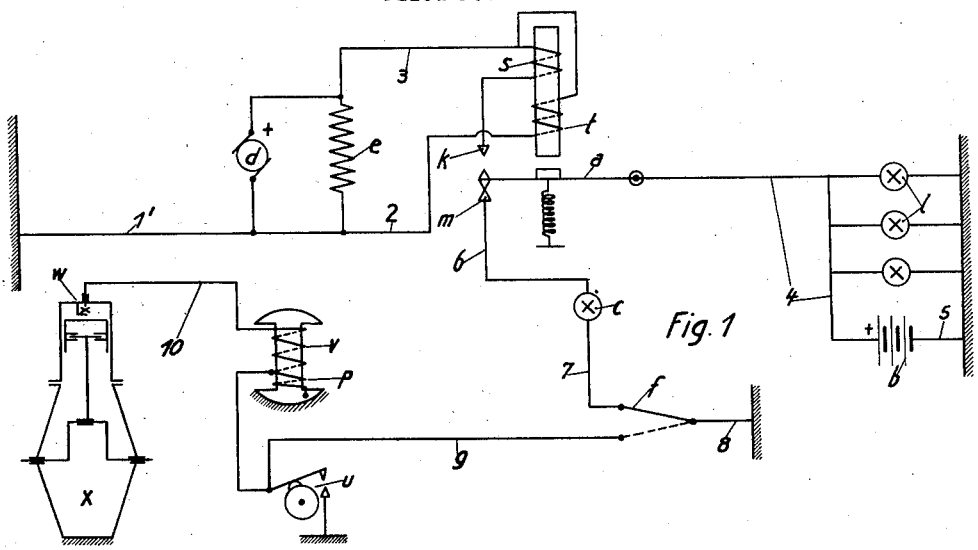

In the accompanying drawing Fig. 1 represents an embodiment of the invention as applied to a vehicle in which no electric starting device is used, or in which a starting device is used, the circuit of which is not closed by the automatic charging switch.

Figure 2:
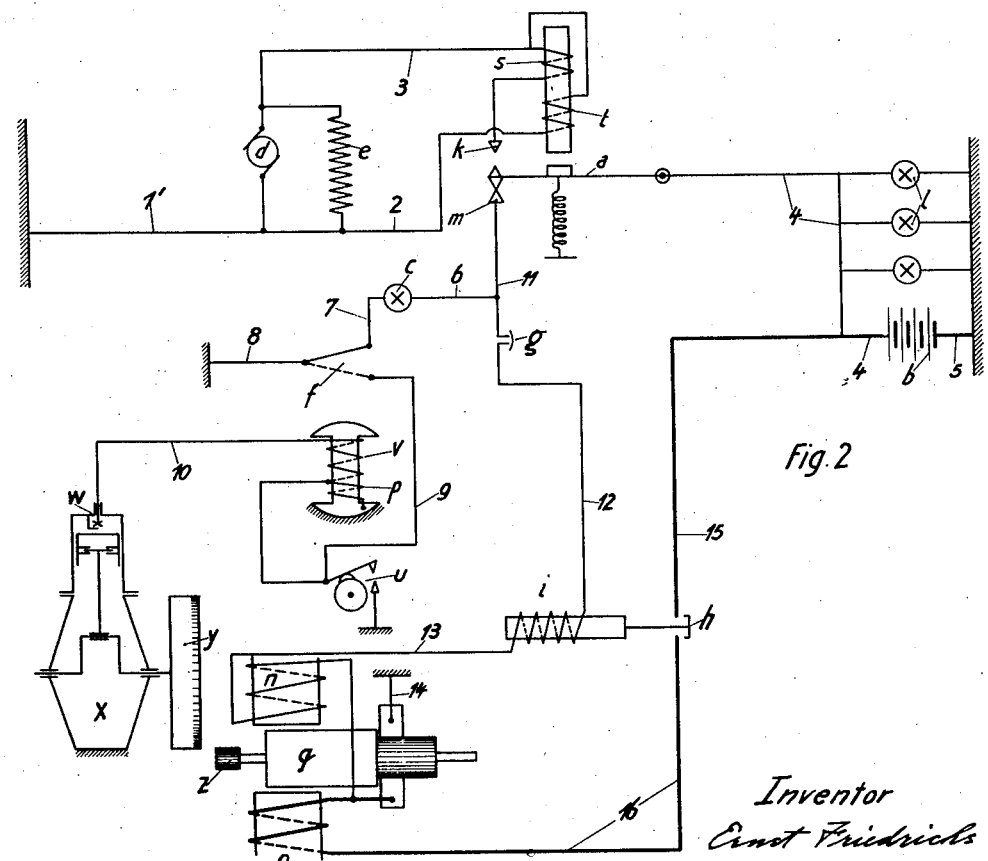

Fig. 2 shows the switch system for lighting vehicles, in which the current circuit for setting the starting device in operation depends upon the position of the automatic charging switch.

In the two figures $d$ is the armature and $e$ the exciter coil of a dynamo driven by the vehicle motor $x$; $a$ is the switch lever, $s$ the current and $t$ the potential winding of an automatic charging switch producing the connection between the dynamo $d$, $e$, and a battery $b$, which switch connects the dynamo and the battery through pressing the lever $a$ against the working contact $k$ and in addition has a second so-called rest contact $m$, against which the lever $a$ lies when the dynamo voltage is lower than the battery voltage. Current consumers $l$ are fed alternately or in common by the dynamo and the battery, $c$ is a signal device, preferably an incandescent lamp, $p$ represents the primary winding and $v$ the secondary winding of a magneto, $u$ an interrupter and $f$ a cut-off switch for the ignition.

Through the lead 1, one terminal of the dynamo is grounded, the second terminal is connected by the lead 3 to the branching point of the windings $s$ and $t$, the second end of the winding $t$ is connected by the lead 2 to the grounded terminal of the dynamo and the second end of the winding $s$ to the working contact $k$ of the charging switch. From the turning point of the switch lever $a$, runs a lead 4 to the battery terminal of the same designation as that of the dynamo terminal which is connected to the lead 3. The other battery terminal is grounded through a lead 5. The current consumers are connected between the leads 4 and ground.

One end of the primary winding $p$ is grounded, the other end is connected to one end of the secondary winding $v$ and also with the contact lever of the interrupter $u$, whose stationary contact is grounded. The second end of the secondary winding is connected by a lead 10 to the ignition device $w$ of the vehicle motor $x$. From the connection between the winding $p$ and the interrupter $u$ a lead 9 branches off to a contact of an ignition cut-off switch $f$; the turning point of the switch lever of this ignition switch is grounded by a lead 8. When the lever of the cut-off switch $f$ is in contact with the lead 9, the lever and the stationary contact of the interrupter are grounded, the interrupter is short-circuited in this position of the switch $f$ indicated in dotted lines, and the ignition is cut off. When the cut-off switch is in the position indicated in heavy lines, the ignition is in operating condition, for the interrupter is no longer short-circuited.

The windings $t$ and $s$ are so arranged that their electrical effects are cumulative when the current flows from the dynamo to the battery. As soon as the voltage of the dynamo is somewhat higher than that of the battery, the switch lever $a$ is brought into contact with the working contact $k$, for the winding $t$, acting alone, draws the lever $a$ upward against the action of a retracting spring. After the lever $a$ comes in contact with the contact $k$, the current flows from the dynamo to the battery and strengthens, by the action of the coil $s$, the closing power of the switch $a$. If the voltage of the dynamo falls below that of the battery, then the current flows from the battery to the dynamo and thereby weakens the closing power of the switch so that the lever is pulled to the rest contact $m$ by the spring attached to the lever $a$. According to the invention, a signal lamp $c$ is connected by means of a lead 6 to the rest contact $m$ and by means of a lead 7 to the aforesaid second contact of the ignition switch $f$ which is grounded in the position of this switch for operating the ignition. The method of operation of the device is as follows:

The vehicle can run only when the ignition is in condition for operation, that is, when the lever of the switch $f$ is in the position shown in full lines. In this case, the lamp $c$ lights as long as the lever $a$ lies on the rest contact $m$, that is, so long as the dynamo voltage is lower than the battery voltage, in other words, when the vehicle motor is at a standstill or running slowly. The current circuit of the signal lamp then comprises the lead 4 from the ungrounded terminal of the battery, the lever $a$ to the rest contact $m$, the lead 6 to the lamp $c$, lead 7, operating contact of the ignition switch $f$ and lead 8 which is grounded and through the lead 5 back to the battery. When the vehicle motor is started or accelerated, the dynamo voltage rises with the speed of the vehicle motor until the lever $a$ is brought against the working contact $k$, and thus connects the dynamo with the battery. Simultaneously the lamp goes out because its current circuit is interrupted at the rest contact $m$. So long, therefore, as the ignition is in operation, that is, so long as the car is running, the lamp $c$ in the known manner, shows the position of the automatic charging switch, and therefore also disturbances in the system which prevent the operation of the switch in the proper manner.

When the vehicle is standing still, the lever $a$ will always lie upon the rest contact $m$. The lamp $c$ will then burn until its current circuit is interrupted by placing the switch $f$ into the position indicated in dotted lines, that is, until the ignition is cut off. The lamp will, therefore, warn the driver upon leaving the vehicle to insure it by shutting off the ignition; in this way the signal lamp serves for indicating the position of the charging switch as well as the position of the ignition switch.

In the system according to Fig. 2, the current for setting in operation a starting device, passes through the rest contact $m$ and the lever $a$ of the charging switch so that at a certain number of rotations of the starting motor the starting device is automatically disconnected and cannot be switched in again while the vehicle motor is operating at a higher speed, whereby injuries to the connection between the vehicle motor and the starting motor are prevented. The starting motor is provided with an auxiliary field winding $n$ made up of numerous turns of considerable resistance. To complete the starting circuit, an electro-magnet $i$, which is excited by the current in line 12, activates a switch $h$ and thereby closes a second switch step by which the main portion of the current flows through the main field winding $o$ which has a smaller number of windings and lower resistance, and trough the armature of the starting motor and causes the motor to speed up. In the first switch step the current of the starting device flows from the battery $b$ through the lead 4, through the lever $a$, the rest contact $m$, the lead 11 to the switch $g$, from this through the lead 12 to the winding of the electro-magnet $i$, from it through the lead 13 to the auxiliary field winding $n$ and from it to the armature $q$ of the starting motor, from it through the lead 14 to ground, and through the lead 5 back to the battery. The armature of the electro-magnet $i$ together with the switch $h$ is moved inwardly until its pulling power overbalances the resistance of the retractile spring, whereupon it closes the switch *h*. In the second switch step, which is thus produced, the main part of the current flows from the battery through the leads 4 and 15, through the switch *h* and the lead 16 to the main field winding *o*, through the armature 9 and lead 14 to ground, and through the lead 5 back to the battery. A small part of the current flows from the battery to the armature *q* by way of the first switch step and holds fast the armature of the winding *i* and the switch *h* until the switch *g* is released or until the speed of the combustion motor is sufficient to lift the lever *a* from the rest contact *m*.

According to the invention in this system the lead 6 of the signal lamp *c* is connected to any point of the lead 11, while the lead 7 is connected to the contact of the ignition switch *f* which is grounded during the operation of the ignition. The lamp *c* will then during the operation of the vehicle motor indicate the position of the automatic switch, and therefore when the switch *g* is held down too long it will show when the starting motor has been automatically disconnected. If the starting motor is stationary, it will call the attention of the driver to the fact that he ought to shut off the ignition when he leaves the vehicle, and conversely, will show him whether the ignition is ready for operation when he wishes to start the combustion motor.

Naturally, the invention can also be used with all other starting devices which are set in operation by a lead branching off from the rest contact *m*. Furthermore, it is not limited to magneto electric ignitions, but embraces all electric ignitions for whose cut-off devices a switch member can be arranged which in the position for operating the ignition places a contact on that battery pole which is not connected with the movable contact member of the automatic charging switch.

The starting and lighting system illustrated in the drawings is a single wire system, that is, one pole of the generator and the corresponding pole of the battery are grounded. The invention is not confined to this system but may efficaciously be applied to a two-wire system, by connecting the generator and starter pole to the corresponding battery pole through a wire instead of through the vehicle frame. In the claims the term "ground" is intended to cover a permanent electrical connection which may be through the vehicle frame or through a wire or system of wires.

I claim:

1. In an electrical system for vehicles driven by internal combustion motors, a direct current generator driven by the motor, a storage battery, the negative pole of the generator and the negative pole of the battery being connected together, an electromagnetic cut-out switch having a voltage winding shunted across the generator poles, a series winding, a stationary contact connected to the positive generator pole through the series winding, a spring loaded contact lever connected to the positive battery pole exclusively of the generator circuit and adapted to move under the influence of the said windings to make contact with the stationary contact when the generator voltage exceeds a certain value; a second stationary contact against which the lever is held by its spring when the current through the windings is insufficient to overcome the pull of the spring, an ignition system for the motor, a signal circuit including an electrical signal connected between said second contact and the negative pole of the battery exclusively of the generator circuit, and means for controlling the ignition system and the signal having two positions, in one of which the signal circuit is closed and the ignition system effective and in the other the signal circuit is open and the ignition system ineffective.

2. In an electrical supply and ignition system for internal combustion engines, the combination of a dynamo driven by the engine, a storage battery, a signal circuit including a signal, a battery cut-out switch comprising a movable contact arm connected to one terminal of the battery exclusively of the dynamo circuit, a back contact for said arm connected to one terminal of the signal the other terminal of which signal is connected to the other terminal of the battery exclusively of the dynamo, and means for controlling the ignition system and the signal having two positions in one of which the signal circuit is closed and the ignition system effective and in the other the signal circuit is open and the ignition system ineffective.

3. The system claimed in claim 2 in which the ignition system is a magneto ignition system of the type making use of a grounding switch operable to render the ignition system ineffective by grounding the same; and the means for controlling the ignition system and the signal is the said grounding switch arranged to alternately complete the signal circuit through ground and connect the ignition circuit to ground.

4. In an electrical current supply system for vehicles having an internal combustion engine and a dynamo driven thereby arranged to charge a storage battery through the control of a battery cut-out switch operable to assume a connect or disconnect position to respectively connect or disconnect the battery to or from the dynamo, with an ignition system for the engine and an ignition switch therefor arranged to assume a running position and an idle position to respectively render the ignition system effective and ineffective; the combination of a signal, a signal control circuit therefor exclusive of the dynamo circuit, contact means connected in series in said circuit arranged to close and open respectively in the running and idle positions of the ignition switch, and a second contact means in series in said signal circuit arranged to close and open respectively in the disconnect and connect positions of the cut-out switch.

In testimony whereof I have affixed my signature.

DIPL. ING. ERNST FRIEDRICHS.